(No Model.)
S. C. HOUGHTON.
BLOWER FOR FIRE GRATES.
No. 310,825. Patented Jan. 13, 1885.
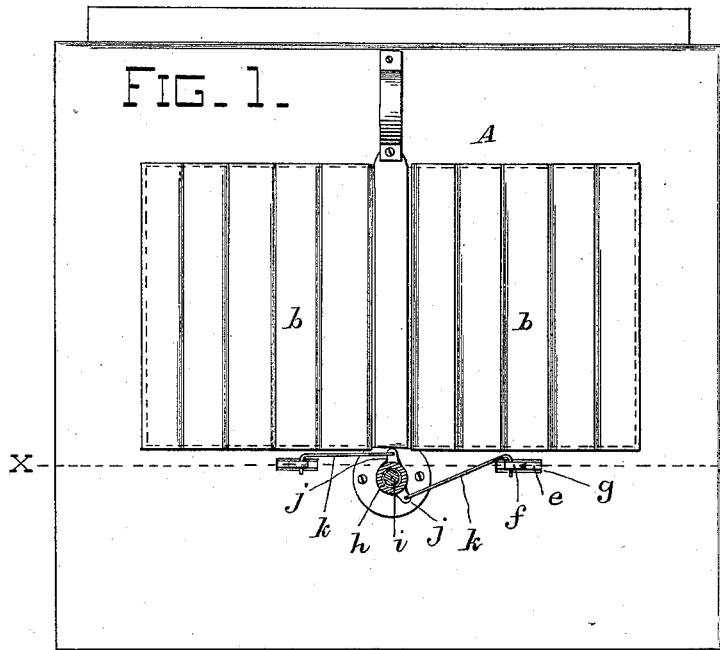
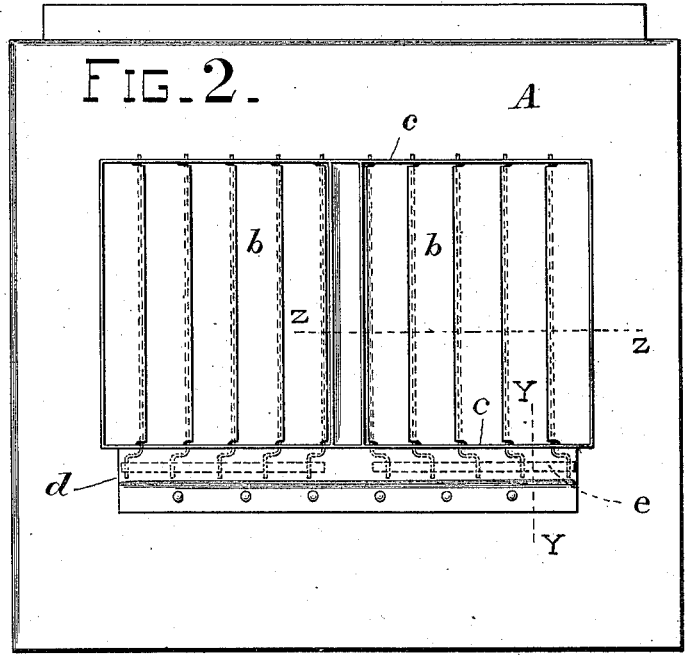
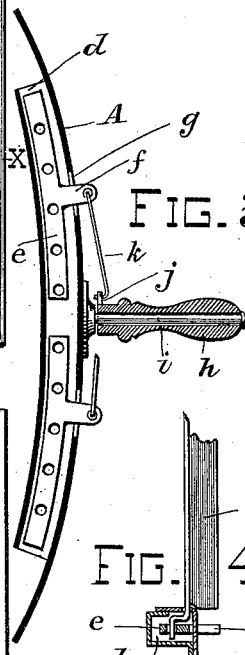
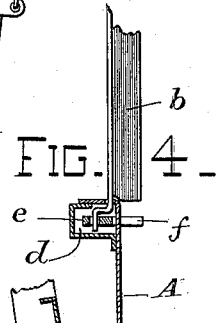
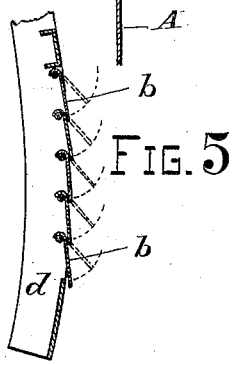
WITNESSES
Wilmer Bradford
W. B. Beazley
INVENTOR
S. C. Houghton

UNITED STATES PATENT OFFICE.

STEPHEN C. HOUGHTON, OF SAN FRANCISCO, CALIFORNIA.

BLOWER FOR FIRE-GRATES.

SPECIFICATION forming part of Letters Patent No. 310,825, dated January 13, 1885.

Application filed November 17, 1883. (No model.)

*To all whom it may concern:*

Be it known that I, STEPHEN CHASE HOUGHTON, of the city and county of San Francisco, State of California, have invented a new and useful Improvement in Blowers for Fire-Grates, of which the following is a full, correct, and exact description.

My invention relates to an improved blower for fire-grates; and it consists in the combination of devices hereinafter described and claimed.

To enable others skilled in the art to make and use my invention, I will now proceed to describe the manner in which I have carried it out.

Any style of register or valved opening can be applied to the blower; but I prefer to employ a series of folding slats, like an ordinary shutter, as hereinafter more fully described.

Referring to the accompanying drawings, Figure 1 represents a front elevation; Fig. 2, a rear elevation; Fig. 3, a section on the line X X of Fig. 1; Fig. 4, a section on the line Y Y of Fig. 2, and Fig. 5 a section on the line Z Z of Fig. 2.

Let A represent a blower such as is ordinarily used in front of a fire-opening for fanning the fire in the grate. In this blower, above the level of the grate, I make either a single or double opening, in which I arrange a series of slats, $b$ $b$, on journals, so that they can be opened or closed, like an ordinary shutter. In the drawings, Figs. 1 and 2, I have represented a double opening.

To form bearings for the journals on which the shutters turn, I bend the upper and lower edges of the opening inward, so as to form flanges $c$ $c$, and in these flanges I make holes through which the journals of the shutters pass and in which they bear. On the inner side of the blower I construct a square tube, $d$, just below the lower flange, $c$, so that the flange itself forms the top of the tube, and into this tube the lower journals of the slats or shutters pass. These lower journals are cranked, and the cranked ends are journaled in a bar, $e$, which moves freely in the box or tube. When I use a double opening, as shown at Figs. 1 and 2, the shutters or slats on each side close outward toward the sides of the blower, so that when they are closed they overlap one another and conform to the shape of the blower, and the series of shutters or slats on each side is connected by the cranked journals of the slats with a separate bar, $e$. Each of the bars $e$ $e$ is provided with a projecting eye, $f$, which extends through a narrow slotted opening, $g$, to the outside of the blower. On the outside of the blower, and just below the middle of the register or valved opening, I secure a projecting handle, $h$, on a center-pin, $i$, so that it can turn freely. To the end of this handle next to the blower I secure two short arms or levers, $j\,j$, on opposite sides of the handle. One of these levers I connect by a wire, $k$, with the eye $f$ on one side of the handle, and the other lever I connect by a similar wire with the eye $f$ on the opposite side of the handle, so that by grasping the handle and turning it slightly in one direction the levers and their connections draw the bars $e$ $e$, and so open the shutters, and by turning the handle in the opposite direction the shutters are closed. When the shutters are closed, they form a practically air-tight surface or portion of the blower, so that the blower will act to fan the fire by compelling the air to pass underneath the grate in the usual way; but by opening the shutters air will be admitted above the fire in proportion to the areas of the openings, and the draft or blowing action is correspondingly decreased.

It is apparent that the slats or shutters could be placed horizontally and operated in the same way and with the same effect, or a circular register with a movable circular cut-off could be used.

I do not confine myself to any special style, form, or construction of register, as the effect would be the same in any case, so long as provision is made for admitting air above the grate and shutting it off when desired. By this means a blower is adapted for obtaining a material saving in fuel, as the draft can be regulated with great precision, according to the necessities of the case, and at the same time a portion of the heat which would otherwise escape up the chimney is admitted into the room.

I am aware of Patent No. 5,698, of 1848, and do not claim the construction therein shown and described.

Having thus described my invention, what I claim, and desire to secure by Letters Patent, is—

1. A blower for fire-grates having one or more openings made in it above the level of the grate, in combination with a series of slats or shutters, $b$, mounted upon journals across said opening or openings, the journals of the slats being formed into cranks, the bar $e$, provided with perforations for the ends of said cranks, and suitable devices for opening and closing said slats, consisting of a handle, $h$, and rods $k$, substantially as described.

2. A blower for fire-grates having slats or shutters $b$ mounted across an opening or openings above the fire-grates, the lower journals of said slats or shutters being formed into cranks and connected with a sliding bar, $e$, in combination with the handle $h$, with its arms or levers $j\,j$, and the connecting rods or wires $k\,k$, for operating the shutters, substantially as described.

In witness whereof I hereunto set my hand.

S. C. HOUGHTON.

Witnesses:
W. B. BEAIZLEY,
F. D. MUNCKTON.